United States Patent

Kolb et al.

[11] Patent Number: 5,961,926
[45] Date of Patent: *Oct. 5, 1999

[54] MICROPLATE ASSEMBLY AND METHOD OF PREPARING SAMPLES FOR ANALYSIS IN A MICROPLATE ASSEMBLY

[75] Inventors: Alfred J. Kolb, Madison, Conn.; Roy L. Manns, Marshfield Hills, Mass.; Kenneth E. Neumann, Elmhurst, Ill.

[73] Assignee: Packard Instrument Co., Inc., Meriden, Conn.

[*] Notice: This patent issued on a continued prosecution application filed under 37 CFR 1.53(d), and is subject to the twenty year patent term provisions of 35 U.S.C. 154(a)(2).

[21] Appl. No.: 08/127,304

[22] Filed: Sep. 27, 1993

[51] Int. Cl.[6] ................................... B01L 11/00
[52] U.S. Cl. .................... 422/101; 422/104; 210/323.1; 210/474; 435/305.2; 435/809
[58] Field of Search ................................ 422/101, 104; 210/323.1, 474; 206/499; 220/507; 435/300, 301, 310, 311, 809

[56] References Cited

U.S. PATENT DOCUMENTS

| | | | |
|---|---|---|---|
| 3,649,464 | 3/1972 | Freeman | 220/507 |
| 3,888,770 | 6/1975 | Avital et al. | 210/238 |
| 4,038,149 | 7/1977 | Liner et al. | 435/300 |
| 4,154,795 | 5/1979 | Thorne | 435/300 |
| 4,298,796 | 11/1981 | Warner et al. | 250/328 |
| 4,493,815 | 1/1985 | Fernwood et al. | 422/101 |
| 4,599,314 | 7/1986 | Shami | 435/300 |
| 4,728,792 | 3/1988 | Warner et al. | |
| 4,822,741 | 4/1989 | Banes | 435/300 |
| 4,933,554 | 6/1990 | Lehtinen et al. | |
| 4,948,442 | 8/1990 | Manns | 422/101 |
| 5,047,215 | 9/1991 | Manns | 435/311 |
| 5,108,603 | 4/1992 | Schuette | 210/323.1 |
| 5,141,719 | 8/1992 | Fernwood et al. | 210/323.1 |
| 5,188,733 | 2/1993 | Wang et al. | 422/101 |
| 5,294,795 | 3/1994 | Lehtinen et al. | |
| 5,298,753 | 3/1994 | Sonne et al. | |

FOREIGN PATENT DOCUMENTS

| | | |
|---|---|---|
| 41 14 611 A1 | 11/1991 | European Pat. Off. . |
| 2 365 811 | 4/1978 | France . |
| WO 9117460 | 11/1991 | WIPO . |

OTHER PUBLICATIONS

Potter et al., "A liquid scintillation counter specifically designed for samples deposited on a flat matrix", *Phys. Med. Biol.*, vol. 31, No. 4, pp. 361–369, 1986, Printed in Great Britain.

*Primary Examiner*—Laura Edwards
*Attorney, Agent, or Firm*—Arnold White & Durkee

[57] ABSTRACT

A microplate assembly for use in analyzing samples captured on a filter medium comprises a carrier plate, a holding tray, a collimator, and a cover film. These elements are generally rectangular in shape and are sized to stack on top of one another. The holding tray is positioned within the carrier plate, the collimator and filter medium are positioned within the holding tray with the filter medium positioned beneath the collimator, and the cover film is sealed over the collimator. To prepare samples in the microplate assembly for analysis, the samples are captured on the filter medium and the filter medium is placed in the holding tray. After adding scintillation cocktail or luminescent substrate to the filter medium, the collimator is placed over the holding tray with the filter medium positioned between the collimator and the holding tray and the samples disposed in the sample wells. The carrier plate, the holding tray, the filter medium, and the collimator are provided with complementary keyed corners to facilitate alignment of these elements relative to one another. The wells of the collimator include respective lower rims protruding into the filter medium to minimize crosstalk through the filter medium. The cover film seals the microplate assembly so that the samples are prepared for analysis.

21 Claims, 4 Drawing Sheets

MICROPLATE ASSEMBLY AND METHOD OF PREPARING SAMPLES FOR ANALYSIS IN A MICROPLATE ASSEMBLY

FIELD OF THE INVENTION

The present invention relates generally to multi-well sample trays which are commonly referred to as microplates and which are used to hold a large number (e.g., 24, 48, 96, or more) of samples in a standardized format to be assayed by various techniques such as autoradiography, liquid scintillation counting (LSC), luminometry, etc. In particular, the present invention relates to a microplate assembly and method which permits any filter medium chosen by a user to be placed in the microplate assembly for analysis and counting.

BACKGROUND OF THE INVENTION

Many microplate assays important in drug research, molecular biology, and biotechnology involve the binding or uptake of radioisotopic or luminescent tracers to target macromolecules or whole cells to form labelled complexes. Examples of microplate assays include DNA and RNA hybridizations (e.g., dot blots), enzyme activity assays (e.g., reverse transcriptase and kinases), receptor binding assays, and cell proliferation assays. A common feature of all these assays is that a labelled complex must be separated from any excess tracer that does not react with the target macromolecules or whole cells during the binding process. This is typically done by capturing or immobilizing the labelled complex on a suitable filter medium and washing away the unreacted tracer. Once separated, the material captured on the filter medium is typically assayed by autoradiography, liquid scintillation counting (LSC), or luminometry. In some cases, the filter medium is used to specifically bind the assay components, while in other cases the filter medium is used as a filtration medium. Assay performance is highly dependent on the type of filter material used, where typical filter materials include glass fiber, nylon, nitrocellulose, phosphocellulose, or other suitable material. Even differences in the same type of filter materials made by different suppliers may be subtle enough to adversely affect assay performance.

One technique for assaying samples captured on a filter medium requires the individual samples to be cut from the filter medium and counted in individual scintillation vials using a liquid scintillation counter (LSC). A drawback of this technique is that the analysis and quantitation of bound samples immobilized on the filter medium requires time consuming sample preparation. In addition, this technique is expensive because the individual scintillation vials containing large volumes of scintillation fluid are discarded following use.

Another technique for assaying samples captured on a filter medium encloses the filter medium in a sample bag, treats the filter medium with scintillation liquid, and places the bag containing the treated filter medium into a scintillation counter. To reduce crosstalk between the samples on the filter medium during analysis, the filter medium itself is provided with a printed crosstalk reducing pattern. An example of such a technique is the 1205 Betaplate system manufactured by Wallac Oy of Turko, Finland. While this technique substantially reduces the amount of time for sample preparation and analysis, the technique generally requires a user to employ special non-standard filters available only from the manufacturer of the scintillation counter. The 1205 Betaplate system, for example, employs a non-standard 6×16 filter format rather than the standard 8×12 filter format. If the user wants the benefit of reduced time for sample preparation and analysis, the user is locked into the filter medium produced by a particular manufacturer. The user cannot employ the filter of his or her choice. Moreover, since the crosstalk reducing pattern is built into the filter medium itself and the filter medium is discarded following use, the crosstalk reducing pattern and its manufacturing cost are consumed with the discarded filter medium. Yet another drawback of this technique is that the analyzed product, i.e., a bag containing a treated filter medium, is not in the microplate format. Thus, the filter medium in this technique cannot be used in any applications requiring the microplate format. A related drawback is that various types of ancillary equipment used in assays, including washing, dispensing, and stacking equipment, are adapted to operate with the microplate format. Since the filter medium in this technique is not included in a device having the microplate format, the filter medium cannot be used with such ancillary equipment.

Accordingly, there exists a need for a microplate assembly and method which overcomes the above-noted drawbacks associated with existing techniques.

SUMMARY OF THE INVENTION

A primary object of the present invention is to provide a microplate assembly and method which permits any filter medium chosen by a user to be placed in the microplate assembly.

Another object of the present invention is to provide a microplate assembly and method which permits a filter medium having samples captured thereon to be placed in the microplate assembly for preparation, analysis and counting. Since the microplate assembly is constructed in the microplate format, the filter medium may be used in any applications or ancillary equipment requiring the microplate format.

Yet another object of the present invention is to provide a microplate assembly and method which permits samples captured on a filter medium to be prepared, analyzed and counted in the microplate assembly with improved throughput. The throughput of the microplate assembly and method is even better than the throughput of existing multiple sample methods.

Still another object of the present invention is to provide a microplate assembly and method which permits samples captured on a filter medium to be prepared, analyzed and counted accurately and inexpensively.

A further object of the present invention is to provide a microplate assembly and method which is cost-effective and easy to manufacture.

Other objects and advantages of the present invention will become apparent upon reading the following detailed description and upon reference to the accompanying drawings.

In accordance with the present invention, the foregoing objects are realized by providing a microplate assembly for use in analyzing samples captured on a filter medium having an upper and lower surface, comprising a holding tray having a bottom wall and side walls connected to the bottom wall, the holding tray receiving therein the filter medium with the lower surface adjacent to the bottom wall of the holding tray; and a collimator abutting the upper surface of the filter medium, the collimator being disposed substantially parallel to the bottom wall of the holding tray, the collimator having wells formed therein for surrounding the samples on the filter medium. In a preferred embodiment, the microplate assembly further includes a reusable carrier plate for supporting the holding tray.

The present invention further provides that in a microplate assembly using a holding tray and a collimator having sample wells formed therein, a method of preparing samples for analysis, the method comprising the steps of capturing the samples on a filter medium, placing the filter medium in the holding tray, adding scintillation cocktail or luminescent substrate to the filter medium, and placing the collimator over the holding tray with the filter medium positioned therebetween so that the samples are prepared for analysis.

DETAILED DESCRIPTION OF THE PREFERRED EMBODIMENT

Figure 1:
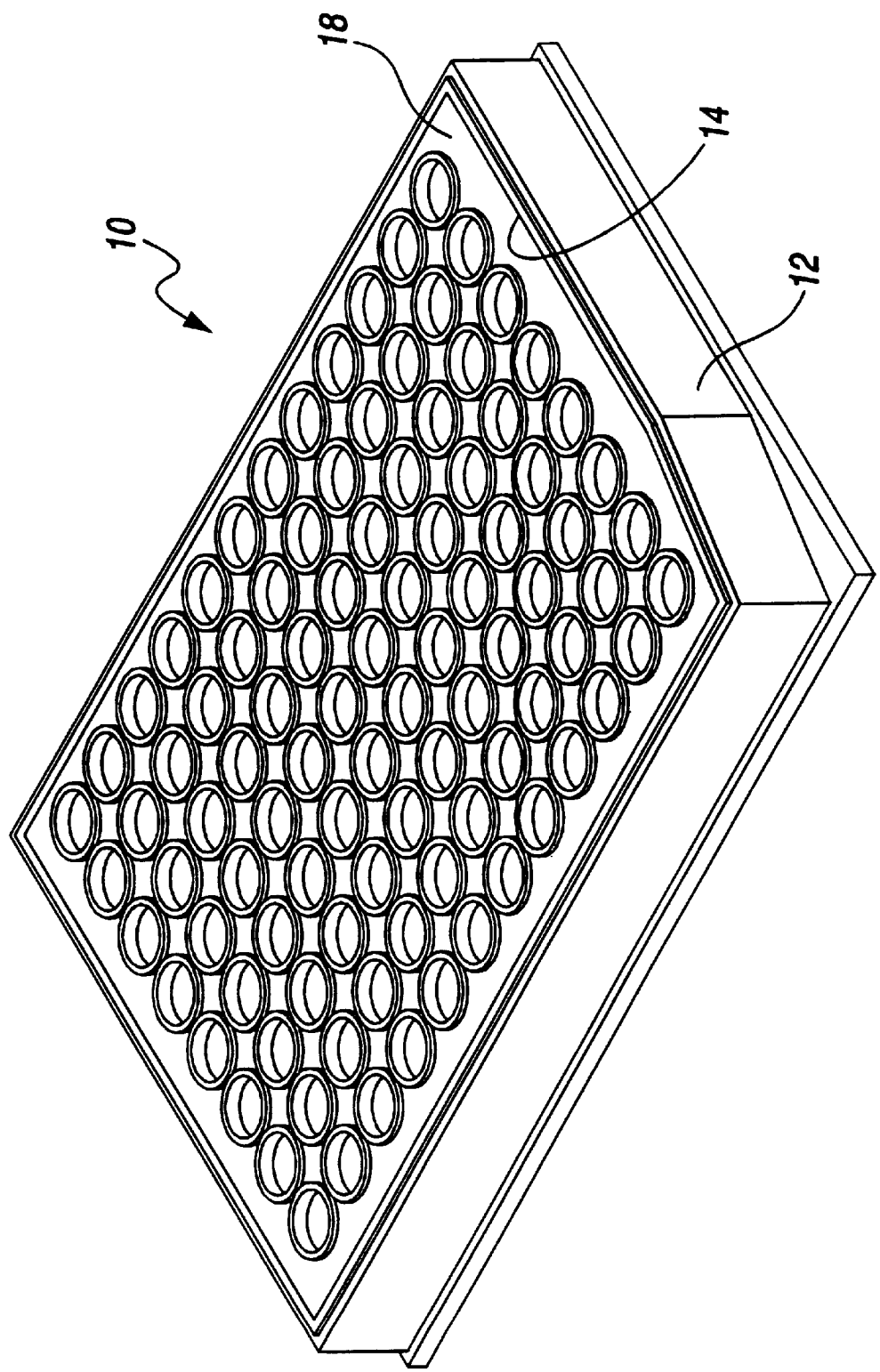
FIG. 1 is a perspective view of a microplate assembly embodying the present invention.
Figure 2:
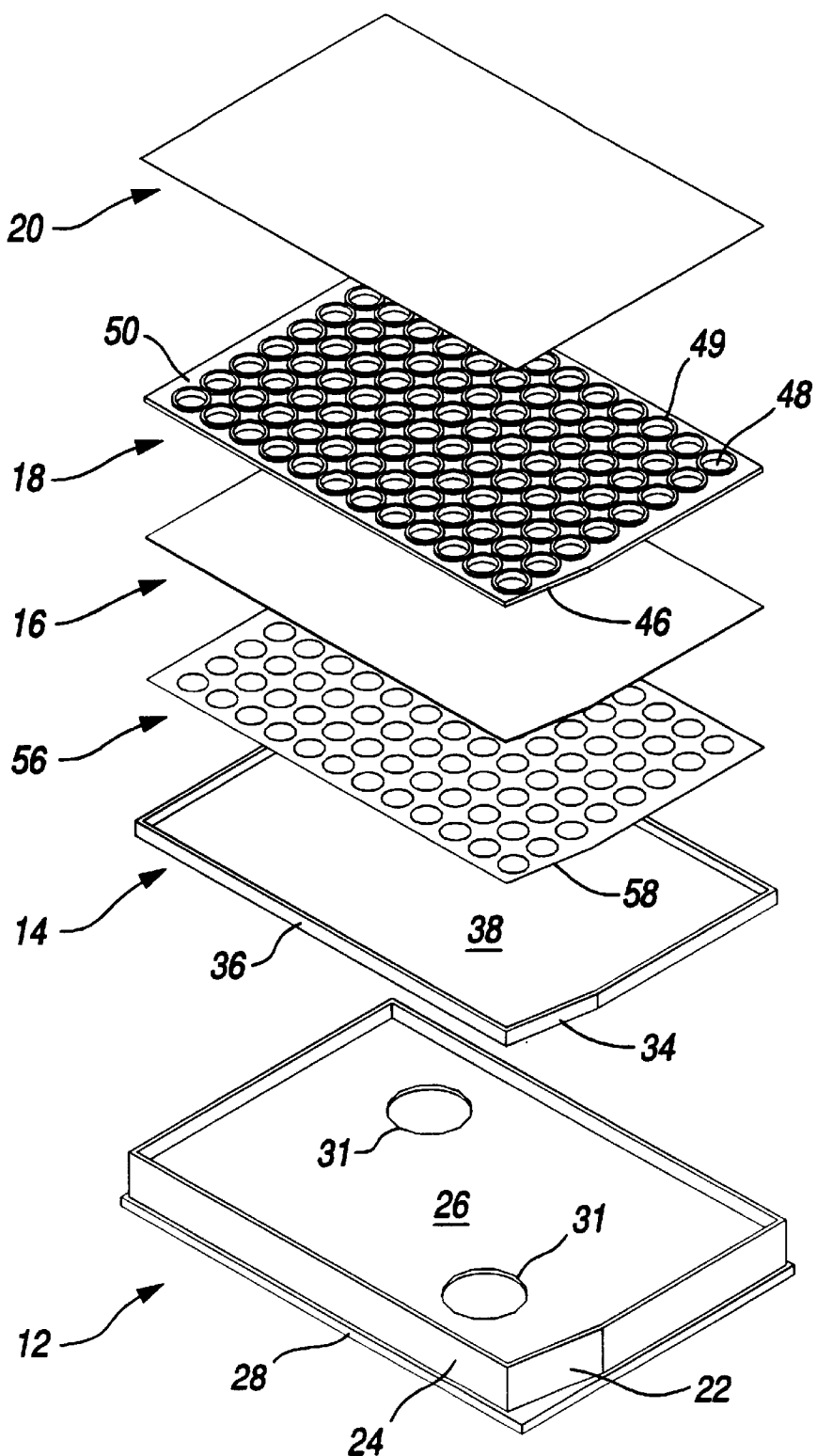
FIG. 2 is an exploded perspective view of the microplate assembly in FIG. 1.
Figure 3:
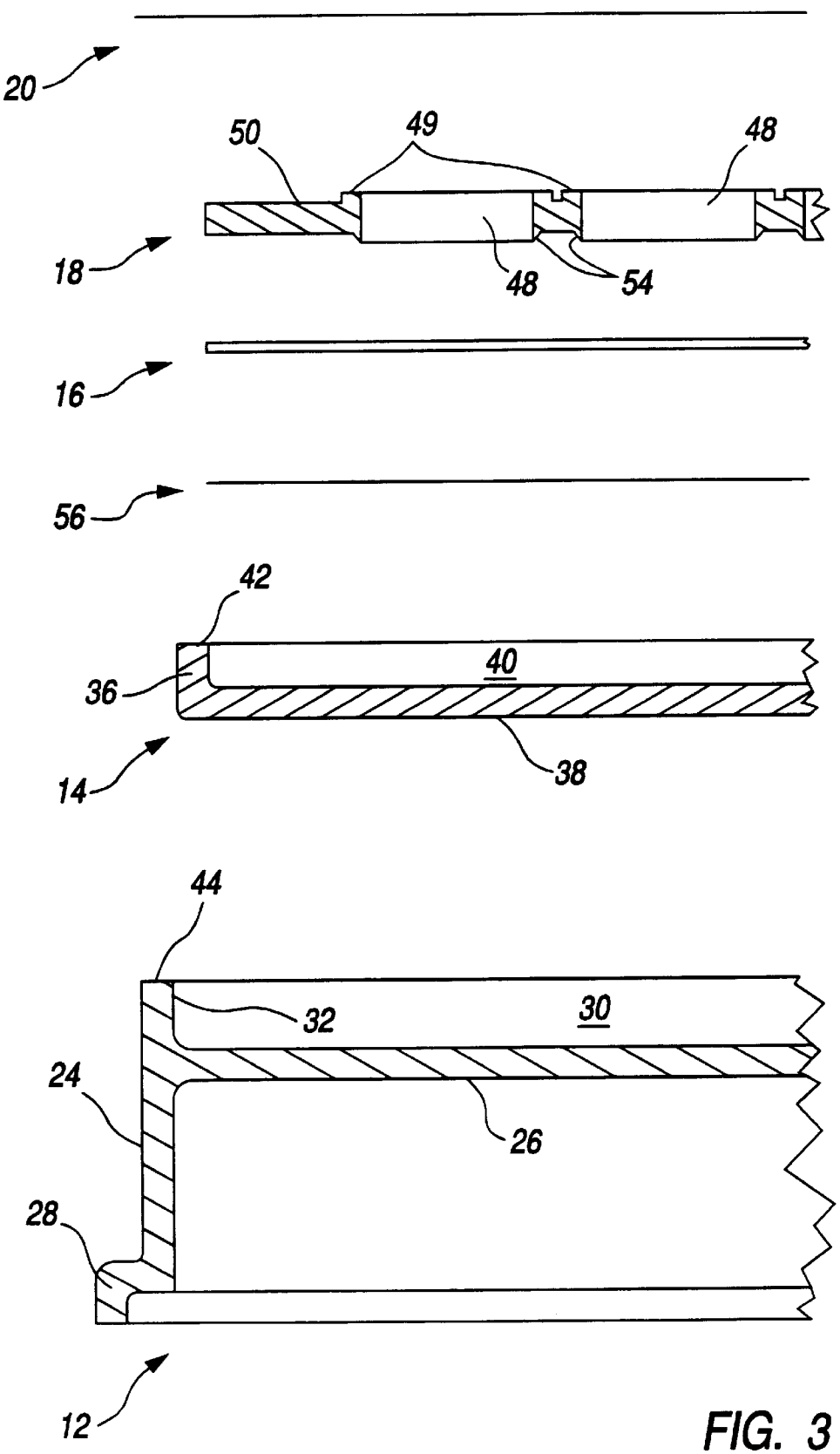
FIG. 3 is an exploded cross-section of the microplate assembly in FIG. 1.

Turning now to the drawings, FIGS. 1–3 illustrate a microplate assembly 10 including a carrier plate 12, a holding tray 14, a filter medium 16, a collimator 18, and a cover film 20. These elements are sized to stack on top of one another. In particular, the holding tray 14 is positioned within the carrier plate 12, the collimator 18 and filter medium 16 are positioned within the holding tray 14 with the filter medium 16 positioned beneath the collimator 18, and the cover film 20 is sealed over the collimator 18.

The carrier plate 12 has a generally rectangular shape with a keyed corner 22. As discussed below, the holding tray 14, the filter medium 16, and the collimator 18 also have similar keyed corners permitting easy location and positive positioning of these elements during construction of the microplate assembly 10. The carrier plate 12 includes a peripheral side wall 24 and a base 26 integrally connected to a central section of the side wall 24, and the side wall 24 includes a peripheral foot 28 which permits another microplate assembly to be stacked beneath the assembly 10 with the upper surface of its carrier plate abutting the horizontal portion of the foot 28. The side wall 24 and its foot 28 extend around the periphery of the generally rectangular base 26. As shown in FIG. 2, the keyed corner 22 is formed in the side wall 24 but not in the peripheral foot 28. Since the base 26 is connected to the central section of the side wall 24, a rectangular compartment 30 is formed for receiving the holding tray 14 therein. The base 26 preferably includes a pair of finger holes 31 located adjacent to diagonally opposite of the base 26. The finger holes 31 have a ¾ inch diameter and permit easy "push-up" removal of the holder tray 14 once the holding tray 14 is positioned within the rectangular compartment 30. The rectangular compartment 30 has side walls comprised of an upper section 32 of the side wall 24 and a bottom wall comprised of the base 26. The carrier plate 12 is preferably constructed of molded solvent-resistant plastic so that the carrier plate 12 may be reused.

The carrier plate 12 is preferably constructed and arranged so that the microplate assembly 10 is in standard microplate format. For example, the side wall 24 and the peripheral foot 28 are part of the standard microplate format. Also, the carrier plate 12 has the dimensions equal to the standard microplate format. In particular, the base 26 is approximately 5.03 inches long and 3.37 inches wide. The side wall 24 is approximately 0.55 inches in depth, with the upper section 32 being approximately 0.11 inches deep. Both the base 26 and the side wall 24 have a thickness of approximately 0.05 inches. With the foregoing construction, the carrier plate 12 acts as an adapter which transforms the microplate assembly 10 into standard microplate format.

The holding tray 14 has a generally rectangular shape sized to fit snugly within the rectangular compartment 30 of the carrier plate 12. The holding tray 14 has a keyed corner 34 to facilitate placement of the holding tray 14 within the rectangular compartment 30. When the holding tray 14 is held within the rectangular compartment 30 of the carrier plate 12, the outside surface of the keyed corner 34 abuts the inside surface of the keyed corner 22 of the carrier plate 12. The holding tray 14 has four side walls 36 and a bottom wall 38 integrally connected to the side walls 36. The side walls 36 and the base or bottom wall 38 form a generally rectangular compartment 40 for receiving the filter medium 16 therein.

The outer length and width dimensions of the holding tray 14 are slightly smaller than the inner dimensions of the rectangular compartment 30 of the carrier plate 12 so that the holding tray 14 fits snugly within the rectangular compartment 30. Similarly, the outer depth dimension of the holding tray 14 is slightly greater than the inner depth dimension of the rectangular compartment 30 so that the tops 42 of the tray side walls 36 are slightly higher than the top 44 of the carrier plate side wall 24. In the preferred embodiment, the base 38 is approximately 4.78 inches long and 3.12 inches wide, and the side walls 36 of the holding tray 14 are approximately 0.12 inches deep. Like the carrier plate 12, the side walls 36 and the base 38 have a wall thickness of approximately 0.05 inches. Since the holding tray 14 contacts liquids during assays, it is made of a solvent-resistant plastic to permit long-term reuse, thereby reducing assay costs. In an alternative embodiment, the carrier plate 12 and the holding tray 14 are integrally connected to form a single structure.

Figure 4:
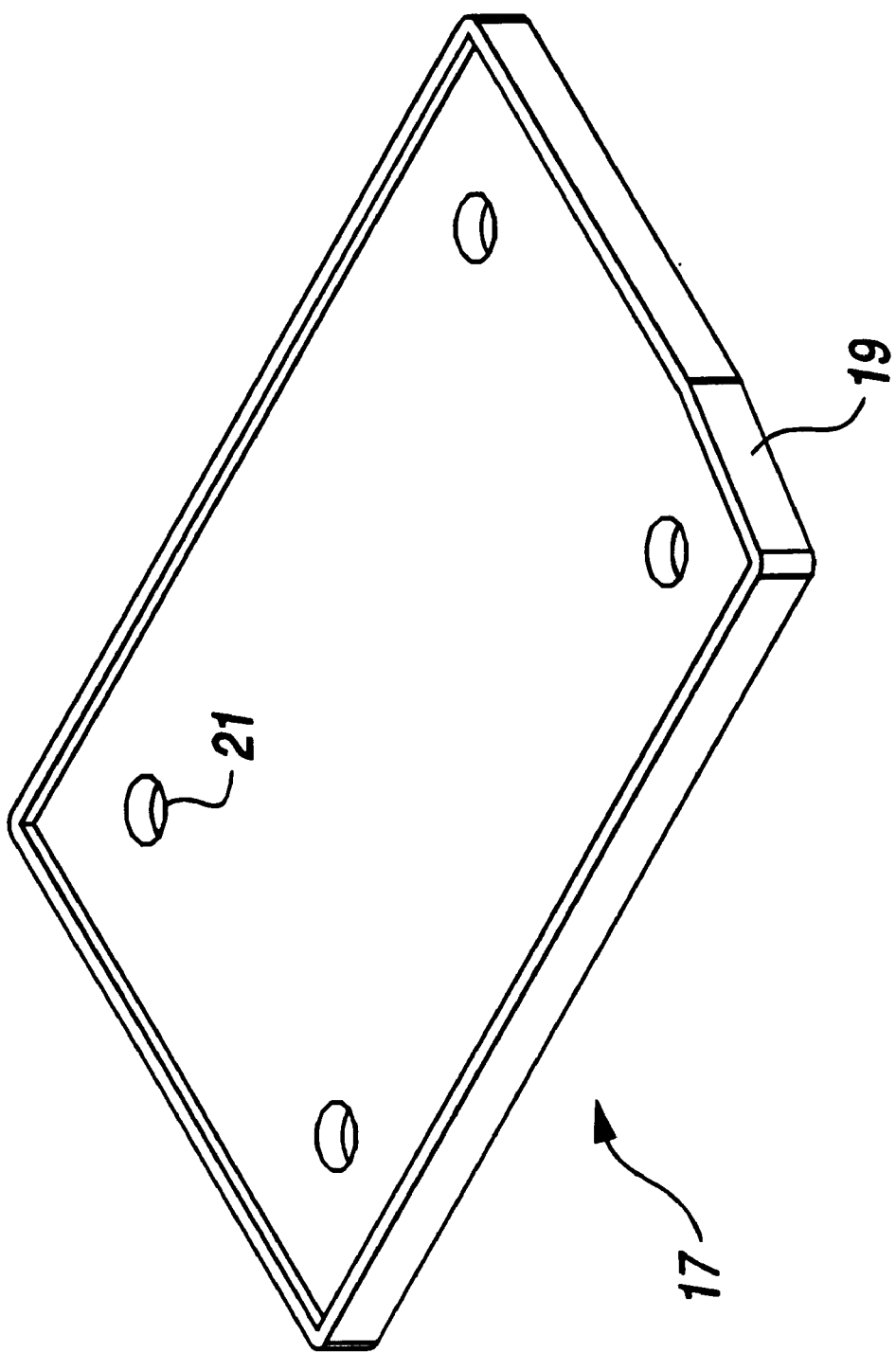
FIG. 4 is a perspective view of a template for cutting filter medium.

The filter medium 16 is a filtration or hybridization media preferably with a thickness ranging from 0.005 inches to 0.020 inches. The microplate assembly 10 allows virtually any filter medium 16 chosen by a user to be analyzed, including glass fiber, nylon, nitrocellulose, phosphocellulose, or other suitable material. The filter medium 16 is cut to the size and geometry of the rectangular compartment 40 in the holding tray 14 either before or after collection or hybridization of the labeled samples. The filter medium 16 is cut using a generally rectangular cutting template 17 having a keyed corner 19 matching the keyed corner 34 of the holding tray 14 (FIG. 4). During cutting, the template 17 is provided with four alignment holes 21 in which associated marked locations on the filter medium 16 are centered. In order for the filter medium to be cut to fit snugly within the rectangular compartment 40 in the holding tray 14, the template 17 has length and width dimensions which are slightly smaller than the length and width dimensions of the rectangular compartment 40. In the preferred embodiment, the template 17 is 4.51 inches long and 2.95 inches wide. After cutting the filter medium 16 and capturing the labeled samples, the filter medium 16 is placed into the rectangular compartment 40 of the holding tray 14 with the filter medium 16 abutting the base 38 of the holding tray 14.

The collimator 18 has a generally rectangular shape with a keyed corner 46 to facilitate positioning of the collimator 18 over the filter medium 16 within the rectangular compartment 40 of the holding tray 14. In the assembled form of the microplate assembly 10, the outside surface of the keyed corner 46 abuts the inside surface of the keyed corner 34 of the holding tray 14. To achieve a tight fit between the collimator 18 and the rectangular compartment 40 of the holding tray 14, the length and width dimensions of the collimator 18 are slightly smaller than the inner length and width dimensions of the compartment 40. Moreover, the depth dimension of the collimator 18 (not including the upper rims 49) is slightly smaller than the depth dimension of the rectangular compartment 40 so that the collimator 18 (except for the upper rims 49) is completely contained within the tray compartment 40 following assembly of the microplate assembly 10. In the preferred embodiment, the collimator 18 is approximately 4.67 inches long, 3.01 inches wide, and 0.065 inches deep. The upper rims 49 are preferably 0.015 inches deep, so that the depth of the collimator 18 including the upper rims 49 is 0.08 inches. The collimator 18 further includes an elongated ledge 50 around the periphery of the collimator 18, adjacent to the outermost wells of the eight-by-twelve matrix. Like the holding tray 14, the collimator 18 is composed of a solvent-resistant plastic which permits long-term reuse.

The collimator 18 is provided with wells 48 for preparation and analysis of the samples on the filter medium 16 beneath the collimator 18. In the preferred embodiment, the collimator 18 includes ninety-six wells arranged in an eight-by-twelve matrix. The centers of the wells 48 are spaced approximately 0.35 inches apart, and each of the wells 48 has a diameter of approximately 0.28 inches. To achieve proper alignment of the samples with the wells 48, the samples are prepared on the filter medium 16 in an eight-by-twelve matrix having substantially the same spacial dimensions as the wells 48. Thus, when the collimator 18 is placed over the filter medium 16 within the tray compartment 40, the ninety-six samples are aligned with the ninety-six wells. The top of each of the wells 48 includes an upper rim 49 which helps to minimize crosstalk between the wells 48 at their tops, as described below. In sealing the microplate assembly 10, the cover film 20 adheres to the upper rims 49 of the wells 48 (FIG. 3).

When the samples in the microplate assembly 10 are counted in a scintillation counter, the wells 48 act to channel or collimate or reflect signals produced by the interaction of the samples and scintillation fluid or luminescent substrate within the filter medium 16 into photodetectors contained in the scintillation counter. During counting, these photodetectors of the scintillation counter are positioned above the individual wells and interlocked with the upper rims 49 of the wells 48 to minimize crosstalk between the wells 48 at their tops while counting with the scintillation counter. More specifically, the interlocking relationship between the photodetectors and the upper rims 49 prevents signals from one well intended for the photodetector interlocked with that well from escaping that well and being detected by a photodetector associated with another well. Also, the interlocking relationship prevents a photodetector interlocked with one well from detecting signals other than those associated with that well.

The wells 48 are further provided with respective pointed lower rims 54 extending from the respective lower circular peripheries of the wells 48. The pointed lower rims 54 drive or "dig" into the filter medium 16 beneath the collimator 18. Once the wells 48 are aligned with the samples on the filter medium 16, the lower rims 54 fix the horizontal position of the filter medium 16 relative to the collimator 18. The lower rims 54 prevent shifting of the filter medium 16 relative to the collimator 18, which might misalign the wells 48 relative to the samples. In addition, the lower rims 54 minimize crosstalk between the samples through the filter medium 16 by pressing into the filter medium 16 between the samples.

To optimize performance of the microplate assembly 10, the holding tray 14 and the collimator 18 are preferably colored so as to maximize counting efficiency and reduce optical crosstalk for both low and high energy radionuclides as well as luminescent labels. For assays and labels requiring maximum light collection efficiency, the holding tray 14 is provided with ninety-six individual highly reflective white spots placed so they correspond directly to the ninety-six sample positions on the filter medium 16 and the ninety-six wells on the collimator 18 to maximize signal. For assays or labels with high energies or signal levels, the holding tray 14 and the collimator 18 are colored black to provide maximum protection against crosstalk. In one embodiment, the color pattern for the holding tray 14 is printed, painted, or hot stamped directly onto the upper surface of the base 38 of the holding tray 14. In another embodiment, the holding tray 14 is injection molded in the appropriate color pattern. In yet another embodiment, the holding tray 14 is colored by placing a colored crosstalk shield 56 between the filter medium 16 and the bottom wall 38 of the holding tray 14. To adhere the crosstalk shield 56 to the bottom wall 38, the crosstalk shield 56 is provided with adhesive along its lower surface. The crosstalk shield 56 has substantially the same dimensions as the filter medium 16, including a keyed corner 58. The tray 14 and the collimator 18 are preferably colored in accordance with Table 1:

TABLE 1

| Label | Holding Tray | Collimator |
|---|---|---|
| $^3$H, $^{125}$I | White Spots on Black | White |
| $^{14}$C, $^{35}$S, $^{33}$P, $^{32}$P Luminescence | Black | Black |

The reusability of the carrier plate 12, the holding tray 14, and the collimator 18 significantly reduces the cost of many types of assays. To begin with, the crosstalk reducing elements, including the lower rims 54, the upper rims 49, and the color pattern, are built into the holding tray 14 and the collimator 18. Since the holding tray 14 and the collimator 18 are reusable, the expense of manufacturing these crosstalk reducing elements is not wasted or consumed following use of the filter medium 16. Furthermore, the samples on the filter medium 16 are analyzed while in the microplate assembly 10. No scintillation vials or associated volumes of scintillation fluid are consumed during the analysis. Except for the filter medium 16, the elements of the microplate assembly 10 are reusable and, therefore, their costs are not consumed following analysis of the filter medium 16.

A general protocol is followed for preparing and analyzing samples in the microplate assembly 10. First, the holding tray 14 is placed in the rectangular compartment 30 of the carrier plate 12. Second, if depositing of samples on the filter medium 16 does not leave an easily visualized pattern of the sample locations on the filter medium 16, then the two outermost diagonally opposing samples are designated and marked with ink or by impression. This allows the filter medium 16 to be easily aligned under the cutting template 17 for cutting and sizing. Third, the filter medium 16 is processed using conventional protocols.

Fourth, the cutting template 17 provided with the microplate assembly 10 is aligned over the filter medium 16 so that the two marked samples are centered in two of the alignment holes 21 on the template 17. The alignment holes 21 are arranged in the template 17 to coincide with the four outermost corner samples on the filter medium 16. Using a sharp knife or blade around the periphery of the template 17, the filter medium 16 is cut to size.

Fifth, the filter medium 16 is placed in the holding tray 14 with the complementary keyed corners properly oriented relative to one another. Scintillation cocktail or luminescent substrate may be added to the entire tray at this time or later on. While the amount of cocktail or substrate added depends upon the filter medium 16 being used, one to three milliliters of cocktail or substrate is preferred. Thicker filter media require greater volumes of cocktail or substrate, but the holding tray 14 should not be overfilled. It is only necessary to fully wet the entire filter medium 16.

Sixth, the collimator 18 is placed in the holding tray 14 over the filter medium 16. During this placement, the user should ensure that the keyed corners 34 and 46 are aligned and that the samples are centered within the appropriate wells. The two marked samples should be centered within the two outermost diagonally opposing wells. If the cocktail or substrate was not added previously, the cocktail or substrate is added to each of the wells 48 at this time using a multichannel pipet to conserve reagents. Ten to thirty-five microliters per well is preferred, again depending on the filter medium 16 being used. Finally, the microplate assembly 10 is sealed by pressing the cover film 20 over the collimator 18. In the preferred embodiment, the cover film 20 is a press-on adhesive film such as TopSeal-A® film commercially available from Packard Instrument Company of Downers Grove, Illinois 60515. The foregoing general protocol for preparing samples for analysis takes relatively little time compared to the technique of cutting individual samples from filter media and placing the samples in individual scintillation vials, or the technique of exposing filter media to X-ray filtm for a period ranging from hours to days.

Samples contained in the microplate assembly 10 are analyzed and counted using a scintillation counter designed to count samples in the microplate format, i.e., in the microplate assembly 10. An example of such a scintillation counter is the TopCount® Microplate Scintillation and Luminescence Counter, commercially available from Packard Instrument Company. Counting samples while they are still in the microplate assembly 10 results in dramatically improved throughput because it avoids the need to cut individual samples from the filter medium 16 for counting the individual scintillation vials using a liquid scintillation counter (LSC). Not only does counting the samples while they are in the microplate assembly 10 result in improved throughput, but it also results in an accurate count, as demonstrated by the conducted experiment described below.

The basic performance of the microplate assembly 10 is measured by evaluating its counting efficiency and its ability to prevent crosstalk between sample wells. The counting efficiency is determined by counting the samples while they are in the assembly 10 using the TopCount® counter and by comparing the resulting count to a count obtained using a c conventional LSC. Counting efficiency is calculated by dividing the CPM (counts per minute) of the TopCount® counter by the DPM (disintegrations per minute) of the LSC. Crosstalk is determined by dividing the average CPM of the eight wells surrounding an active well by the CPM of the active well, where crosstalk includes both optical and radiation components.

In an experiment to demonstrate the basic performance of the microplate assembly 10, the counting efficiency and crosstalk were evaluated by depositing and drying nuclide samples of [$^3$H]-DNA, [$^{14}$C]-thymidine, and [$^{32}$P]-ATP onto respective filter media for use in three separate microplate assemblies. In this experiment, the filter media were sheets of GF/C® glass fiber filters manufactured by Whatman Specialty Products Division, Whatman Paper, Ltd. of Fairfield, New Jersey. Each of the filter media was placed into a holding tray of the respective microplate assembly and covered with a collimator, both chosen according to Table 1. Next, twenty-five microliters of MicroScint-O® lipophilic scintillation cocktail were added to the wells of the collimators of the microplate assemblies using a multichannel pipet. A self-adhesive cover film was placed over each of the collimators.

To analyze the nuclide samples in the three microplate assemblies, each of the microplate assemblies was loaded and counted in the TopCount® scintillation counter. All active well spots were then removed, placed into scintillation vials, and assayed for DPM in a LSC. Table 2 summarizes general counting efficiency and crosstalk data of each microplate assembly for each of the three nuclides.

TABLE 2

| Nuclide | Efficiency | Crosstalk |
|---|---|---|
| $^3$H | 20.7% | 0.00% |
| $^{14}$C | 83.0% | 0.00% |
| $^{32}$P | 86.7% | 0.48% |

These results demonstrate that assay performance is comparable to that obtained using conventional techniques. In particular, the microplate assembly 10, in conjunction with a scintillation counter such as the TopCount® counter designed to count the samples while they are still in the assembly, provides excellent absolute counting efficiencies for samples immobilized on filter media. Thus, the microplate assembly 10 permits samples captured on filter media to be analyzed and counted accurately, in addition to quickly and inexpensively. Accurate quantitation can be achieved over a wide dynamic range. Furthermore, the design of the microplate assembly 10 virtually eliminates crosstalk caused by photon transmission.

The microplate assembly 10 permits the analysis of many assays in which the radio or luminescent label is immobilized on a variety of filter media. The microplate assembly 10 allows a user to choose the filter medium most appropriate for the application. Since the microplate assembly 10 is constructed in the microplate format, the filter medium 16 may be used in a variety of applications and ancillary equipment requiring the microplate format. The user is not limited to choosing a particular filter medium which may only be used in limited equipment.

What is claimed is:

1. A microplate assembly for use in analyzing samples captured on a filter medium having an upper and lower surface, comprising:

a holding tray having a bottom wall and side walls connected to said bottom wall, said holding tray receiving therein the filter medium with the lower surface adjacent to said bottom wall of said holding tray; and a collimator removably disposed within said holding tray with the filter medium positioned between said collimator and said bottom wall of said holding tray, said collimator abutting the upper surface of the filter medium and disposed substantially parallel to said bottom wall of said holding tray, said collimator having wells formed therein for surrounding the samples on the filter medium, said bottom wall of said holding tray including wall portions without holes beneath respective ones of said wells.

2. The microplate assembly of claim 1, further including a carrier plate for supporting said holding tray.

3. The microplate assembly of claim 2, wherein said carrier plate includes a flat base portion and a peripheral side wall, said base portion being connected to a central section of said side wall.

4. The microplate assembly of claim 3, wherein said base portion and said side wall form a generally rectangular compartment for receiving said holding tray therein.

5. The microplate assembly of claim 4, wherein said base portion includes finger holes to permit said holding tray to be pushed out and removed from said rectangular compartment.

6. The microplate assembly of claim 2, wherein said carrier plate, said holding tray, and said collimator include complementary keyed corners for aligning said carrier plate, said holding tray, and said collimator relative to one another.

7. The microplate assembly of claim 1, wherein said side walls and said bottom wall of said holding tray form a generally rectangular compartment for receiving the filter medium therein.

8. The microplate assembly of claim 1, wherein said wells of said collimator are arranged in a matrix corresponding to the arrangement of the samples on the filter medium so that each of said wells surrounds a separate sample.

9. The microplate assembly of claim 1, wherein said wells of said collimator include respective lower rims protruding from the respective lower peripheries of said wells into the filter medium to minimize crosstalk through the filter medium.

10. The microplate assembly of claim 1, wherein each of said wells of said collimator includes an upper rim formed around the upper periphery thereof to minimize crosstalk between said wells.

11. The microplate assembly of claim 1, further including a cover film, positioned over said collimator, for sealing the microplate assembly.

12. The microplate assembly of claim 1, wherein said holding tray and said collimator are reusable.

13. The microplate assembly of claim 2, wherein said carrier plate, said holding tray, and said collimator are reusable.

14. A microplate assembly for use in analyzing samples captured on a generally rectangular filter medium having an upper and lower surface, comprising:

a holding tray forming a generally rectangular compartment having bottom wall, opposing front and back walls, and a pair of opposing side walls, the filter medium being disposed within said rectangular compartment of said holding tray with the lower surface adjacent to said bottom wall of said rectangular compartment; and a collimator having a generally rectangular shape and abutting the upper surface of the filter medium, said collimator being disposed substantially parallel to said bottom wall of said rectangular compartment, said collimator having wells formed therein for surrounding the samples on the filter medium.

15. The microplate assembly of claim 14, further including a carrier plate for supporting said holding tray.

16. The microplate assembly of claim 15, wherein said carrier plate, said holding tray, and said collimator have complementary keyed corners to facilitate alignment of said carrier plate, said holding tray, and said collimator relative to one another.

17. The microplate assembly of claim 14, wherein said wells of said collimator include respective lower rims protruding from the respective lower peripheries of said wells into the filter medium to minimize crosstalk through the filter medium.

18. The microplate assembly of claim 14, wherein said holding tray and said collimator are reusable.

19. The microplate assembly of claim 15, wherein said carrier plate, said holding tray, and said collimator are reusable.

20. The microplate assembly of claim 1, wherein said wells include generally smooth side walls without discontinuities.

21. The microplate assembly of claim 20, wherein said side walls of said wells are substantially perpendicular to the filter medium.

* * * * *